UNITED STATES PATENT OFFICE.

GEORGE McKAY, OF SMYRNA, DELAWARE.

COMPOSITION OF MATTER FOR SEALING PURPOSES.

SPECIFICATION forming part of Letters Patent No. 643,251, dated February 13, 1900.

Application filed September 7, 1899. Serial No. 729,762. (No specimens.)

*To all whom it may concern:*

Be it known that I, GEORGE MCKAY, a citizen of the United States, residing at Smyrna, in the county of Kent and State of Delaware, have invented a new and useful composition of matter to be used as a substitute for lead for sealing purposes, also as a roofing material for the formation of conduits, pavements, &c., of which the following is a specification.

My composition consists of the following ingredients combined substantially in the proportions stated, namely: sulfur, forty-five per cent.; brick-dust, twenty-five per cent.; foundry-sand, ten per cent.; tin, two per cent.; lead, two per cent.; bismuth, two per cent.; plaster-of-paris, four per cent.; borax, five per cent.; iron-filings, five per cent.

In combining the ingredients the sulfur is first melted by the proper degree of heat to bring it to a thin liquid, and while being vigorously stirred the brick-dust is gradually added thereto, which will tend to coagulate the mass on account of the peculiar property of sulfur, which thickens with the reduction of temperature below a certain point without becoming solidified. The temperature of the mass is then raised until it again reaches the thin liquid state, when the sand is likewise added, the vigorous stirring and agitation being all the while continued. The addition of the sand will also tend to coagulate the mass and it must be permitted to regain its thin liquid condition before the addition of other ingredients. The tin, lead, and bismuth may be next added after having previously been melted, after which the plaster-of-paris and iron-filings are mixed together and added to the agitated mass, and finally the borax may be so added. After all of these ingredients have been introduced the stirring is continued until all have combined in a homogeneous mass, when it should be poured or otherwise withdrawn from the receptacle in which it has been heated and permitted to cool until solidified. It is of course obvious that in withdrawing the composition from the heated vat it may be run into molds, so as to be cast into any desired shapes.

If it is desired to impart any particular color to the composition, a suitable mineral coloring material should be added thereto while in the liquid state and being agitated—as, for instance, red lead, graphite, or sulfate of copper.

In practice I have found that the various ingredients before being added to the sulfur, after the latter is melted, should be heated to a certain degree, so as not to unduly chill and consequently clog the mass.

While the above formula for general purposes is that which I prefer to use in the formation of my improved compound, yet for various special purposes the ingredients thereof may be varied and others substituted for the minor ingredients—as, for instance, the iron-filings may be omitted and furnace-slag substituted therefor—and this is especially the case when the compound is to be used in electrical conduits, since the presence of the iron-filings is objectionable in such work, and when slag is thus substituted I have found by experiment that it should constitute at least ten per cent. of the total mass, and the tin, lead, and bismuth may be omitted.

When the compound is to be used for sealing purposes, the plaster-of-paris, as well as the iron-filings, may be omitted and the amount of lead, tin, and bismuth proportionately increased. In sealing a joint the compound is melted and poured into the joint, and on account of its thin liquid state when heated to the proper degree it will fill all the crevices of the joint and at the same time adhere firmly thereto, after the manner of a cement, so that when it is solidified there is no possibility of leakage taking place at such a joint, and by tests it has been found that the joint is capable of withstanding more pressure than an ordinary iron pipe, and therefore will not be affected by either the internal or external pressure which may be brought thereon in ordinary use.

The weight of my improved compound is only one-sixth of that of lead and is superior to the latter for sealing up joints, since, as above stated, it has the property of a cement, taking firm hold upon the surfaces of the pipe.

When used for roofing purposes, the material is melted and poured upon the properly-prepared surface of the roof until of the desired thickness, and after it has set it will be found to be perfectly impervious to water and that it does not crack with the changes of temperature.

Another use to which I have put this compound is the forming of ornamental figures for building purposes, since the material when poured into a mold in its liquid state fills every depression in said mold, thereby producing sharp and clear-cut lines, and I have also found that by increasing the proportion of brick-dust and omitting the iron-filings and sand the surfaces of a molded block or figure may be polished, so as to present an attractive appearance. Also I have found that by using marble or granite chips or finely-broken particles of such material in the place of the brick-dust and sand and omitting the iron-filings and slag monuments or blocks therefor may be cast and polished so as to give the general appearance of granite or marble, it being understood that the sulfur and other ingredients will firmly cement and hold the marble or ground chips in position and permit the polishing of their exposed surfaces to produce the desired results. Still another important use for this compound has been found which consists in coating the exposed surfaces of iron or steel ships, since when so coated the barnacles which have a tendency to adhere to such vessels and greatly retard their progress are prevented from so doing, since the sulfur contained in the compound is injurious to the life of such barnacles.

Having thus fully described my invention, what I claim as new and useful is—

1. The herein-described composition of matter consisting of sulfur, brick-dust, tin, lead, bismuth, plaster-of-paris and borax, in substantially the proportions described.

2. The herein-described composition of matter consisting of forty-five per cent. of sulfur, twenty-five per cent. of brick-dust, ten per cent. of foundry-sand, two per cent. of tin, two per cent. of lead, two per cent. of bismuth, four per cent. of plaster-of-paris, five per cent. of iron-filings, five per cent. of borax, substantially as and for the purpose set forth.

In testimony whereof I have hereunto affixed my signature in the presence of two subscribing witnesses.

GEORGE McKAY.

Witnesses:
S. S. WILLIAMSON,
L. W. MORRISON.